United States Patent [19]
Fujita et al.

[11] Patent Number: 5,719,249
[45] Date of Patent: Feb. 17, 1998

[54] REACTIVE SILICON GROUP-CONTAINING POLYOXYALKYLENE-POLYSILOXANE COPOLYMER

[75] Inventors: Masayuki Fujita; Hiroshi Iwakiri; Fumio Kawakubo, all of Hyogo, Japan

[73] Assignee: Kanegafuchi Kagaku Kogyo Kabushiki Kaisha, Osaka, Japan

[21] Appl. No.: 671,076

[22] Filed: Jun. 27, 1996

Related U.S. Application Data

[63] Continuation of Ser. No. 364,099, Dec. 27, 1994, abandoned.

[51] Int. Cl.$^6$ .................................................. C08G 77/04
[52] U.S. Cl. .............................. 528/27; 528/20; 528/29; 525/403; 525/474; 525/479; 556/446
[58] Field of Search ............................ 528/20, 27, 29; 525/403, 474, 479; 556/446

[56] References Cited

U.S. PATENT DOCUMENTS

| | | | |
|---|---|---|---|
| 4,269,992 | 5/1981 | Litteral et al. | 556/446 |
| 4,302,571 | 11/1981 | Arai et al. | 525/409 |
| 4,341,675 | 7/1982 | Nakamura | 525/100 |
| 4,537,944 | 8/1985 | Imai et al. | 528/34 |
| 4,552,919 | 11/1985 | Mikami et al. | 528/34 |
| 5,013,800 | 5/1991 | Inoue | 528/21 |
| 5,070,170 | 12/1991 | Robertson et al. | 528/25 |
| 5,112,512 | 5/1992 | Nakamura | 528/25 |
| 5,162,451 | 11/1992 | Nakamura | 525/409 |
| 5,342,914 | 8/1994 | Iwakiri et al. | 528/30 |

FOREIGN PATENT DOCUMENTS

| | | |
|---|---|---|
| 55-13767 | 1/1980 | Japan . |
| 60-167259 | 2/1987 | Japan . |
| 2-93225 | 3/1991 | Japan . |
| 3-160981 | 12/1992 | Japan . |

*Primary Examiner*—Randy Gulakowski
*Attorney, Agent, or Firm*—Armstrong, Westerman, Hattori, McLeland & Naughton

[57] ABSTRACT

The present invention provides a reactive silicon group-containing polymer containing at least one reactive silicon group per molecule, the main chain of the polymer being essentially a copolymer of organopolysiloxane and polyoxyalkylene, which causes no macro phase separation during storage and gives a hardened material having an excellent weathering resistance, little residual tack and excellent coating adhesivity. The present invention provides a process for the preparation of the foregoing reactive silicon group-containing polymer. A novel process for the preparation of the polymer as defined above is provided, which comprises allowing an alkylene oxide to undergo ring opening polymerization with an organopolysiloxane compound having an active hydrogen-containing functional group with which said alkylene oxide is reactive as an initiator in the presence of a catalyst to synthesize a polymer of organopolysiloxane and polyoxyalkylene, and then introducing a reactive silicon group into said polymer. Another process for the preparation of the polymer as defined above is provided, which comprises allowing an alkylene oxide to undergo ring opening polymerization with an organopolysiloxane compound having an epoxy group in the presence of a catalyst with an active hydrogen-containing compound as an initiator to synthesize a polymer the main chain of which is essentially a copolymer of organopolysiloxane and polyoxyalkylene, and then introducing a reactive silicon group into said polymer.

2 Claims, No Drawings

REACTIVE SILICON GROUP-CONTAINING POLYOXYALKYLENE-POLYSILOXANE COPOLYMER

This application is a continuation of application Ser. No. 08/364,099 filed Dec. 27, 1994, abandoned.

FIELD OF THE INVENTION

The present invention relates to a novel reactive silicon group-containing polymer and a process for the preparation thereof.

BACKGROUND OF THE INVENTION

As reactive silicon group-containing polyoxyalkylene polymers have been known as disclosed in JP-A-50-156599 (The term "JP-A" as used herein means an "unexamined published Japanese patent application"), JP-A-54-6096, JP-A-57-126823, JP-A-55-82123, JP-A-55-131022, JP-A-62-230822, JP-A-63-83131, JP-A-3-47825, JP-A-3-72527, U.S. Pat. Nos. 3,632,557, and 4,345,053. Because of their durability and coating Properties, these reactive silicon group-containing polyoxyalkylene polymers are widely applied for sealing materials, adhesives, etc. However, these compounds leave some properties to be desired in weathering resistance and heat resistance and thus are disadvantageous in that they suffer from residual tack and surface contamination due to the attachment of dust or the like.

In an attempt to solve these problems, JP-A-55-21453 proposes an approach which comprises allowing a reactive and/or nonreactive organopolysiloxane polymer or a copolymer of reactive and/or nonreactive organopolysiloxane and polyoxyalkylene to undergo reaction with or be adding thereof to a reactive silicon group-containing polyoxyalkylene polymer. However, this approach is practically disadvantageous in that the compatibility of the polysiloxane component with the polyoxyalkylene component is insufficient, thereby causing macro phase separation or curing thereof during storage.

SUMMARY OF THE INVENTION

An object of the present invention is to provide a reactive silicon group-containing polymer containing at least one reactive silicon group per molecule, the main chain of the polymer being essentially a copolymer of organopolysiloxane and polyoxyalkylene, which causes no macro phase separation during storage and gives a cured material having an excellent weathering resistance, little residual tack and excellent coating adhesion.

Another object of the present invention is to provide a process for the preparation of the foregoing reactive silicon group-containing polymer.

These objects of the present invention will become more apparent from the following detailed descriptions and examples.

The foregoing objects of the present invention are accomplished with a reactive silicon group-containing polymer, containing at least one reactive silicon group per molecule, in which the main chain of said polymer is essentially a copolymer of organopolysiloxane and polyoxyalkylene.

The foregoing objects of the present invention are also accomplished by a process for the preparation of the polymer as defined above, Which comprises allowing an alkylene oxide to undergo ring opening polymerization with an organopolysiloxane compound having an active hydrogen-containing functional group with which said alkylene oxide is reactive as an initiator in the presence of a catalyst to synthesize a copolymer of organopolysiloxane and polyoxyalkylene, and then introducing a reactive silicon group into said polymer.

The foregoing objects of the present invention are further accomplished by a process for the preparation of the polymer as defined above, which comprises allowing an alkylene oxide to undergo ring opening polymerization with an organopolysiloxane compound having an epoxy group in the presence of a catalyst with an active hydrogen-containing compound as an initiator to synthesize a polymer the main chain of which is a copolymer of organopolysiloxane and polyoxyalkylene, and then introducing a reactive silicon group into said polymer.

DETAILED DESCRIPTION OF THE INVENTION

The present invention will be further described hereinafter.

In the foregoing copolymer of organopolysiloxane-polyoxyalkylene, these components are connected to each other via covalent bond and thus cause no macro phase separation.

The organopolysiloxane and polyoxyalkylene copolymer preferably contains a functional group necessary for introduction of a reactive silicon group into the molecule. The term "functional group necessary for introduction of a reactive silicon group" as used herein is meant to indicate a functional group capable of introducing a reactive silicon group by one stage or after causing the reaction with a compound having a plurality of functional groups.

The synthesis of the organopolysiloxane-polyoxyalkylene copolymer containing a functional group necessary for introduction of a reactive silicon group into the molecule can be accomplished by the following methods, but the present invention should not be construed as being limited thereto.

(A) Method which comprises the hydrosilylation reaction of an organopolysiloxane compound containing hydrosilyl group with a polyoxyalkylene compound containing a plurality of functional groups, at least one unsaturated group;

(B) Method which comprises the ring opening polymerization of an alkylene oxide with an organopolysiloxane compound containing an active hydrogen-containing functional group with which said alkylene oxide is reactive as an initiator in a presence of a catalyst; and (C) Method which comprises ring opening polymerization of an alkylene oxide and an organopolysiloxane having epoxy group in the presence of a catalyst with an active hydrogen-containing compound with which said alkylene oxide is reactive as an initiator.

The organopolysiloxane component employable in the present invention is preferably a derivative of the compounds represented by the following formulae (7) to (9):

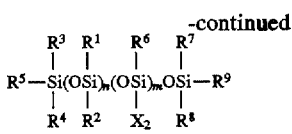

In the general method (A), $X_2$ in formulae (7), (8) and (9) represents —H. In the method (B), $X_2$ in formulae (7), (8) and (9) represents a hydrocarbon group containing at least one functional group selected from the group consisting of —OH, —SH, —NH$_2$, —NHR$^{10}$ and —COOH which may contain ether bond, thioether bond or amino bond. In the method (C), $X_2$ in formulae (7), (8) and (9) represents a hydrocarbon group containing at least one epoxy group which may contain ether bond, thioether bond or amino bond. In these formulae, $R^1$, $R^2$, $R^3$, $R^4$, $R^6$, $R^7$, $R^8$ and $R^{10}$ each represents the same or different $C_{1-6}$ hydrocarbon group, $R^5$ and $R^9$ each represents a $C_{1-18}$ hydrocarbon group, n represents 0 or an integer 1 to 200, and m represents an integer 1 to 10.

The polyoxyalkylene component of the present invention can be obtained by ring opening polymerization of a cyclic ether compound. The polyoxyalkylene component of the present invention may contain a component which does not fall under these conditions in a moiety at which it is connected to the organopolysiloxane component. Specific examples of the cyclic ether compound include alkylene oxides such as ethylene oxide, propylene oxide, 1-butene oxide, 2-butene oxide, isobutene oxide, 1-hexene oxide, cyclohexene oxide, phenylglycidyl ether, allylglydicyl ether, styrene oxide and glycidol, and tetrahydrofuran.

Particularly preferred among these cyclic ether compounds is a $C_{2-4}$ alkylene oxide such as ethylene oxide, propylene oxide, 1-butene oxide, 2-butene oxide and isobutene oxide. Two or more of these alkylene oxides may be used in combination. In these cases, two or more of these alkylene oxides may be allowed to undergo reaction in admixture or separately.

Examples of the catalyst in the presence of which the alkylene oxide and/or organopolysiloxane containing epoxy group are allowed to undergo ring opening polymerization include alkali catalyst such as KOH, early transition metal compound-porphyrin complex catalyst such as complex obtained by the reaction of an organic aluminum compound with porphyrin as disclosed in JP-A-61-215623, and double metal cyanide complex catalyst as disclosed in U.S. Pat. Nos. 3,278,457, 3,278,458, 3,278,459, 3,427,256, 3,427,334, and 3,427,335. Preferred among these catalysts are early transition series metal compound-porphyrin complex catalyst and double metal cyanide complex catalyst, particularly double metal cyanide complex catalyst.

It is thought that the double metal cyanide complex has a structure represented by the following general formula (10) as disclosed in the foregoing known examples.

$$M_a1[M_s^2(CN)_t]_b(H_2O)_cR_d \quad (10)$$

wherein $M^1$ represents a metallic ion such as $Zn^{2+}$, $Fe^{2+}$, $Fe^{3+}$, $Co^{2+}$, $Ni^{2+}$, $Al^{3+}$, $Sr^{2+}$, $Mn^{2+}$, $Cr^{3+}$, $Cu^{2+}$, $Sn^{2+}$, $Pb^{2+}$, $Mo^{4+}$, $Mo^{6+}$, $W^{4+}$ and $W^{6+}$; $M^2$ represents a metallic ion such as $Fe^{2+}$, $Fe^{3+}$, $Co^{2+}$, $Co^{3+}$, $Cr^{2+}$, $Cr^{3+}$, $Mn^{2+}$, $Mn^{3+}$, $Ni^{2+}$, $V^{4+}$ and $V^{5+}$; R represents an organic ligand; a, b, s and t each represents a positive integer which varies with the valency and coordination number of the metal; and c and d each represent a positive integer which varies with the coordination number of the metal.

In the composite metal cyanide complex represented by the foregoing chemical formula, $M^1$ is preferably $Zn^{2+}$, and $M^2$ is preferably $Fe^{2+}$, $Fe^{3+}$, $Co^{2+}$, $Co^{3+}$ or the like.

Examples of the organic ligand include ketone, ether, aldehyde, ester, alcohol, amide, nitrile, and sulfide.

A particularly preferred example of the double metal cyanide complex is a zinc hexacyanocobaltate complex. Further, a catalyst made of a zinc hexacyanocobaltate complex and other double metal cyanide complexes in combination. Such a combination may be a combination of metallic components or a mixture of two or more catalysts.

The double metal cyanide complex represented by the foregoing chemical formula can be prepared by mixing a metal salt $M^1Pa$ (in which $M^1$ and a are as defined above, and P represents an anion which forms a salt with $M^1$) and a polycyanomethalate (salt):

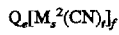

(wherein $M^2$, s and t are as defined above, Q represents a hydrogen atom, alkaline metal or alkaline earth metal, and e and f each represents a positive integer determined by the valency and coordination number of Q and $M^2$, respectively) each in the form of aqueous solution or solution in a mixture of water and an organic solvent, bringing organic ligands R into contact with the resulting double metal cyanide, and then removing extra solvent and organic ligands R.

As Q in the polycyanomethalate (salt) represented by the foregoing formula there may be used a hydrogen atom or any metal such as alkaline metal. The polycyanomethalate (salt) is preferably in the form of lithium salt, sodium salt, potassium salt, magnesium salt or calcium salt. Particularly preferred among these alkaline metal salts are conventional alkaline metal salts, i.e., sodium salt and potassium salt. As the metal salt there may be preferably used a metal halide such as zinc chloride.

The active hydrogen-containing compound with which an alkylene oxide is reactive to be used as an initiator in the method (C) is not specifically limited. From the standpoint of expected physical properties, it is preferably a compound having a molecular weight of not more than 200 containing one or more active hydrogens or compound containing one or more active hydrogens per molecule, the main chain thereof being essentially a polyether.

In the reactive silicon group-containing polymer the main chain of which is essentially an organopolysiloxane-polyoxyalkylene copolymer, a weight ratio of organopolysiloxane component and polyoxyalkylene component may be 99/1 to 1/99, preferably 95/5 to 1/99. If this ratio deviates from the above specified range, an effect for improving weathering resistance, anti-residual tack properties and coating adhesion cannot be exerted. If an emphasis is placed on the coating adhesion within this range, the ratio of organopolysiloxane component may be reduced, e.g., to the range of 40/60 to 1/99. If an emphasis is placed on weathering resistance within this range, the ratio of organopolysiloxane component may be raised, e.g., to the range of 15/85 to 95/5. The molecular weight of the organopolysiloxane-polyoxyalkylene copolymer is preferably in a range of 500 to 50,000, more preferably 3,000 to 30,000, particularly 6,000 to 25,000.

The reactive silicon group as used herein is not specifically limited. A representative example of the reactive silicon group is represented by the following formula (11):

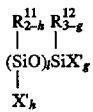

wherein $R^{11}$ and $R^{12}$ each represents a $C_{1-20}$ alkyl group, $C_{6-20}$ aryl group, $C_{7-20}$ aralkyl group or triorganosiloxy group represented by $(R')_3SiO-$, with the proviso that when there are a plurality of $R^{11}$'s or $R^{12}$'s, they may be the same or different; R' represents a $C_{1-20}$ hydrocarbon group, with the proviso that the three (R')'s may be the same or different; X' represents a hydroxyl group or hydrolyzable group, with the proviso that when there are two or more X's, they may be the same or different; g represents 0 or an integer 1 to 3; h represents 0 or an integer 1 to 2, with the proviso that h in the group:

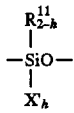

in an amount of l may be different; and l represents an integer 0 to 19, with the proviso that l satisfies the relationship $g+n\Sigma h \geq 1$.

The hydrolyzable group represented by X' is not specifically limited but may be any known hydrolyzable group. Specific examples of such a hydrolyzable group include a hydrogen atom, a halogen atom, an alkoxy group, an acyloxy group, a ketoximate group, an amino group, an amide group, an acid amide group, an aminoxy group, a mercapto group, and an alkenyloxy group. Preferred among these hydrolyzable groups are a hydrogen atom, an alkoxy group, an acyloxy group, a ketoximate group, an amino group, an amide group, an aminoxy group, a mercapto group, and an alkenyloxy group. Particularly preferred among these hydrolyzable groups is an alkoxy group such as methoxy group in the light of mild hydrolyzability and good handleability.

One to three of these hydroxyl groups or hydrolyzable groups may be connected to one silicon atom. The sum $(g+\Sigma h)$ is preferably from 1 to 5. If two or more hydroxyl groups or hydrolyzable groups are in the reactive silicon group, they may be the same or different.

The reactive silicon group may comprise one or more silicon atoms. If the reactive silicon group comprises silicon atoms linked by siloxane bond or the like, the number of silicon atoms may be about 20.

In the present invention, a reactive silicon group represented by the following formula (12) is desirable in the light of availability.

 (12)

wherein $R^{12}$, X' and g are as defined above.

Specific examples of the group represented by $R^{11}$ or $R^{12}$ in the formula (II) include an alkyl group such as methyl group and ethyl group, a cycloalkyl group such as cyclohexyl group, an aryl group such as phenyl group, an aralkyl group such as benzyl group, and triorganosiloxy group represented by $(R')_3SiO-$ wherein R' is a methyl group or a phenyl group. Particularly preferred among the groups represented by $R^{11}$, $R^{12}$ and R' is a methyl group.

The reactive silicon group is present in the organopolysiloxane-polyoxyalkylene copolymer in an amount of at least 1, preferably 1.1 to 5 per one molecule of the latter. If the number of reactive silicon groups contained in one molecule of the polymer falls below 1, the resulting polymer leaves some properties to be desired in curability and thus can hardly exhibit a good rubbery elasticity behavior.

The reactive silicon group may be present at the terminal or inside the molecular chain of the organopolysiloxane-polyoxyalkylene copolymer. If the reactive silicon group is present at the terminal of the molecular chain, an amount of effective network chain of organopolysiloxane-polyoxyalkylene copolymer contained in the finally produced cured material is increased, making it easy to obtain a rubbery hardened material having a high strength, a high elongation and a low elasticity.

Examples of the method for the introduction of the reactive silicon group into a copolymer molecule the main chain of which essentially comprises organopolysiloxane and polyoxyalkylene include the following methods, but the present invention should not be construed as being limited thereto.

(D) Method which comprises reacting an organopolysiloxane-polyoxyalkylene copolymer containing a functional group such as hydroxyl group in molecule with an organic compound containing an active group reactive with said functional group and an unsaturated group to obtain an organopolysiloxane-polyoxyalkylene copolymer containing an unsaturated group, and then allowing the reaction product to be acted upon by a hydrosilane having a reactive silicon group to effect hydrosilylation thereof;

(E) Method which comprises reacting an organopolysiloxane-polyoxyalkylene copolymer containing an unsaturated group obtained in the same manner as in the method (D) with a compound containing a mercapto group and a reactive silicon group; and (F) Method which comprises reacting an organopolysiloxane-polyoxyalkylene copolymer terminated by a functional group such as hydroxyl group, epoxy group or isocyanate group (hereinafter referred to as "functional group Y") with a compound containing a functional group (hereinafter referred to as "functional group Y'") reactive with the functional group Y and a reactive silicon group.

Specific examples of the silicon compound containing a functional group Y' include amino group-containing silanes such as γ-(2-aminoethyl)aminopropyltrimethoxysilane, γ-(2-aminoethyl)aminopropylmethyldimethoxysilane and γ-aminopropyltriethoxysilane; mercapto-containing silanes such as δ-mercaptopropyltrimethoxysilane and γ-mercaptopropylmethyldimethoxysilane; epoxysilanes such as γ-glycidoxypropyltrimethoxysilane, γ-glycidoxypropylmethyldimethoxysilane and β-(3,4-epoxycyclohexyl)ethyltrimethoxysilane; vinyltype unsaturated group-containing silanes such as vinyl triethoxysilane, γ-methacryloyloxypropyltrimethoxysilane and γ-acryloyloxypropylmethyldimethoxysilane; chlorine-containing silanes such as γ-chloropropyltrimethoxysilane, isocyanate-containing silanes such as γ-isocyanate propyltriethoxysilane and γ-isocyanate propylmethyldimethoxysilane, and hydrosilanes such as methyldimethoxysilane; trimethoxysilane and methyldiethoxysilane. However, the present invention should not be construed as being limited to these compounds.

Preferred among these methods is the method (D) or (F). In a preferred embodiment of the method (F), a polymer terminated by a hydroxyl group is reacted with a compound containing an isocyanate group and a reactive silicon group or a compound containing an epoxy group or a reactive silicon group.

When the organopolysiloxane-polyoxyalkylene copolymer containing a reactive silicon group of the present invention (hereinafter referred to as "polymer of the present invention") is exposed to an atmosphere, it is acted upon by moisture to form a three-dimensional network structure which is then cured to obtain a solid material having a rubbery elasticity. Unlike the cured product of a reactive organopolysiloxane or reactive organopolysiloxane composition, the cured material is free of low molecular weight organopolysiloxane which doesn't take part in curing and thus causes no contamination on its surrounding due to bleeding.

The curing of the polymer according to the present invention may be effected in the presence or absence of a silanol condensation catalyst (curing catalyst). As the silanol condensation catalyst, if used, any known such a catalyst is used. Specific examples of such a catalyst include silanol condensation catalysts such as ester titanates (e.g., tetrabutyl titanate, tetrapropyl titanate), tin carboxylates (e..g, dibutyltin dilaurate, dibutyltin maleate, dibutyltin diacetate, tin octylate, tin naphthenate), reaction product of dibutyltin oxide with ester phthalate, dibutyltin diacetyl acetonate, organic aluminum compounds (e..g, aluminum trisacetyl acetonate, aluminum trisethyl acetoacetate), organic aluminum compounds (e.g., diisopropoxy aluminum ethyl acetoacetate, chelate compounds (e.g., zirconium tetraacetyl acetonato, titanium tetraacetyl acetonate), lead octylate, amine compounds or carboxylates thereof (e.g., butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris (dimethylaminomethyl)phenol, morpholine, N-methylmorpholine, 2-ethyl-4-mehylimidazole, 1,8-diazabicyclo(5.4.0)undecene-7(DBU)), low molecular polyamide resins made of excess polyamine and polybasic acid, reaction products of excess polyamine and epoxy compound, silane coupling agents containing amino group (e.g., γ-aminopropyltrimethoxysilane, N-(β-aminoethyl) aminopropylmethyldimethoxysilane), and other known silane condensation catalysts such as acidic catalyst and basic catalyst. These catalysts may be used singly or in combination.

An amount of such a silanol condensation catalyst to be used is preferably in the range of 0.1 to 20 parts by weight, more preferably 1 to 10 parts by weight based on 100 parts by weight of the polymer of the present invention. If this amount is too small, it disadvantageously reduces the curing rate and makes it difficult to allow the curing reaction to proceed thoroughly. On the contrary, if this amount is too great, it disadvantageously causes a local heat generation and bubbles during curing, making it difficult to obtain an excellent hardened material.

The organopolysiloxane-polyoxyalkylene copolymer containing a reactive silicon group of the present invention can be modified with the addition of various fillers. Examples of the fillers employable in the present invention include reinforcing fillers such as fumed silica, precipitated silica, silicic anhydride, hydrous silicic acid and carbon black, fillers such as calcium carbonate, magnesium carbonate, diatomaceous earth, calcined clay, talc, titanium oxide, bentonite, organic bentonite, ferric oxide, zinc oxide, active zinc white and sand balloon, and fibrous fillers such as asbestos, glass fiber and glass filament.

If it is desired to obtain a curable composition having a high strength from these fillers, a filler selected from the group consisting of fumed silica, precipitated silica, anhydrous silica, silicic anhydride, hydrous silicic acid, carbon black, surface treated particulate calcium carbonate, calcined clay, clay and active zinc white may be used in an amount of 1 to 200 parts by weight based on 100 parts by weight of the organopolysiloxane-polyoxyalkylene copolymer containing a reactive silicon group to attain desirable results. On the other hand, if it is desired to obtain a curable composition having a low strength and a high elongation, a filler selected from the group consisting of titanium oxide, calcium carbonate, magnesium carbonate, talc, ferric oxide, zinc oxide and sand balloon may be used in an amount of 5 to 200 parts by weight based on 100 parts by weight of the organopolysiloxane-polyoxyalkylene copolymer containing a reactive silicon group to attain desirable results. It goes without saying that these fillers may be used singly or in admixture.

In application of the organopolysiloxane-polyoxyalkylene copolymer containing a reactive silicon group of the present invention, a plasticizer may be advantageously used in combination with the filler to enhance the elongation of the hardened material or increase the mixing proportion of the filler. As such a plasticizer there may be used a commonly used plasticizer. Examples of such a plasticizer include ester phthalates such as dioctyl phthalate, dibutyl phthalate and butylbenzyl phthalate, aliphatic dibasic acid esters such as dioctyl adipate, isodecyl succinate and dibutyl sebacate, glycol esters such as diethylene glycol dibenzoate and pentaerythritol, aliphatic esters such as butyl oleate and methyl acetylrecinoleate, ester phosphates such as tricresyl phosphate, trioctyl phosphate and octyldiphenyl phosphate, epoxy plasticizers such as epoxy soybean oil and benzyl epoxystearate, polyester plasticizers made of dibasic acid and divalent alcohol, polyethers such as polypropylene glycol and derivatives thereof, polystyrenes such as poly-α-methylstyrene and polystyrene, and plasticizers such as polybutadiene, butadiene-acrylonitrile copolymer, polychloroprene, polyisoprene, polybutene and chlorinated paraffins. These plasticizers may be used singly or in admixture. Such a plasticizer may be used in an amount of 0 to 100 parts by weight based on 100 parts by weight of the organopolysiloxane-polyoxyalkylene copolymer containing a reactive silicon group to attain desirable results.

In application of the organopolysiloxane-polyoxyalkylene copolymer containing a reactive silicon group of present invention, various additives such as adhesion-providing agent (e.g., phenol resin, epoxy resin), adhesion improver, physical property adjustor, storage stability improver, antioxidant, ultraviolet absorbent, metal inactivator, ozone degradation inhibitor, light stabilizer, amine type radical chain reaction terminator, phosphorus peroxide decomposer, lubricant, pigment and foaming agent may be properly added to the copolymer as necessary to obtain a room temperature curing composition. The composition comprising the organopolysiloxane-polyoxyalkylene copolymer containing a reactive silicon group of the present invention is particularly useful as an elastid sealant and can be used as a sealant for building, ship, automobile, road, etc. Further, the composition of the present invention, singly or with the aid of a primer, can be attached to a wide range of substrates such as glass, porcelain, wood, metal and resin products. Thus, the composition of the present invention can be used as various types of sealing compositions and adhesive compositions. Moreover, the composition of the present invention is used as food packaging material, castable rubber material, molding material, etc.

As mentioned above, the composition of the present invention containing a reactive silicon group, the main chain of which is essentially an organopolysiloxane-polyoxyalkylene copolymer, can provide a cured material which causes no phase separation during storage, exhibits an excellent weathering resistance, little residual tack and an excellent coating adhesion.

The present invention will be further described in the following synthesis examples and examples, but the present invention should not be construed as being limited thereto.

SYNTHESIS EXAMPLE 1

0.02 g of a zinc hexacyanocobaltate-glyme complex, a THF solution of 11.4 g of polydimethylsiloxane terminated by alcoholic hydroxyl group at both ends (FZ-3722; hydroxyl number: 100 mgKOH/g; available from Nippon Unicar Company Ltd.), and 7.6 g of propylene oxide were charged into an autoclave. The reaction mixture was then allowed to undergo reaction in a nitrogen atmosphere at a temperature of 76° C. Thereafter, to the reaction system was added 84.2 g of propylene oxide. Unreacted monomers and solvent were removed. The residue was then purified to obtain 100 g of an oily matter. The oily matter, thus obtained, showed no macro phase separation even after a year of storage at room temperature.

GPC analysis of the reaction product showed a single peak different from that of the alcohol-terminated polydimethylsiloxane as a starting material. The reaction product showed a hydroxyl number of 15.0 mgKOH/g.

To 70 g of the reaction product was then added dropwise 3 g of γ-isocyanatepropylmethyldimethoxysilane (KBM-9207, available from Shin-etsu Chemical Co.) in the presence of 0.01 g of tin octylate (U-28, available from Nitto Kasei Co., Ltd.) at a temperature of 75° C. The reaction continued until it was confirmed by IR that absorption by NCO had disappeared. Thus, an organopolysiloxane-polyoxyalkylene copolymer containing a reactive silicon group (polymer 1) was obtained.

COMPARATIVE SYNTHESIS EXAMPLE 1

0.02 g of a zinc hexacyanocobaltate-glyme complex, a THF solution of 1.0 g of dipropylene glycol, and 4.8 g of propylene oxide were charged into an autoclave. The reaction mixture was then allowed to undergo reaction in a nitrogen atmosphere at a temperature of 76° C. Thereafter, to the reaction system was added 72.6 g of propylene oxide. Unreacted monomers and solvent were removed. The residue was then purified to obtain 75 g of an oily matter.

GPC analysis of the reaction product showed a single peak. The reaction product showed a hydroxyl number of 11.8 mgKOH/g.

To 60 g of the reaction product was then added dropwise 2.2 g of γ-isocyanatepropylmethyldimethoxysilane (KBM-9207, available from Shin-etsu Chemical Co., Ltd.) in the presence of 0.01 g of tin octylate (U-28, available from Nitto Kasei Co., Ltd.) at a temperature of 75° C. The reaction continued until it was confirmed by IR that absorption by NCO had disappeared. Thus, a reactive silicon-containing polyoxyalkylene polymer (comparative polymer 1) was obtained.

EXAMPLE 1

To 100 parts by weight of the polymer 1 obtained in Synthesis Example 1 were added 3 parts by weight of tin octylate and 0.5 parts by weight of laurylamine (guaranteed grade, available from Wako Pure Chemical Industries, Ltd.). The mixture was deformed by stirring, and poured into a 2-mm thick mold. After storage for 2 days at a temperature of 23° C., the molded product was examined for residual tack by finger touch. As a result, the molded product showed no tack.

Comparative Example 1

A molded product was prepared in the same manner as in Example 1 except that the comparative polymer 1 obtained in Comparative Synthesis Example 1 was used instead of the polymer 1. After storage for 2 days at a temperature of 23° C., the molded product showed some tack by finger touch.

EXAMPLE 2

To 100 parts by weight of the polymer 1 obtained in Synthesis Example 1 were added 120 parts by weight of calcium carbonate (Hakuenka CCR, available from Shiraishi Kogyo Kaisha, Ltd.), 30 parts by weight of titanium dioxide (Taipaque R820, Ishihara Sangyo Co.), 65 parts by weight of DOP (Kyowa Hakko Co.), 3 parts by weight of tin octylate, and 0.5 parts by weight of laurylamine (guaranteed grade, available from Wako Pure Chemical Industries, Ltd.). The mixture was deformed by stirring, and molded into a 2-mm thick sheet. After storage for 2 days at a temperature of 23° C., the sheet was examined for residual tack by finger touch. For the evaluation of coating adhesion, the sheet was allowed to stand at a temperature of 23° C. for 1 day. The sheet was then coated with a water-borne coating (Tilelac Suisei Top, available from Nippon Paint Co., Ltd.) and a solvent-borne coating (Terabel AE, Nippon Paint Co., Ltd.). The coated sheet was cured at a temperature of 23° C. for 1 week. The coat film was then notched to make pieces of 5×5 squares. An adhesive cellophane tape was then attached onto these squares. The tape was then forced to peel off the sheet at right angle. The coating adhesion was evaluated by the number (n) of squares left on the sheet (represented by n/25). The results are set forth in Table 1.

Comparative Example 2

The evaluation was effect in the same manner as in Example 2 except that the comparative polymer 1 was used instead of the polymer 1. The results are set forth in Table 1.

TABLE 1

|  | Example 2 | Comparative Example 2 |
| --- | --- | --- |
| Polymer | Polymer 1 | Comparative Polymer 1 |
| Residual tack | No tack | Some tack |
| Coating adhesion |  |  |
| Water-borne Coating | 25/25 | 25/25 |
| Solvent borne Coating | 25/25 | 25/25 |

SYNTHESIS EXAMPLE 2

0.02 g of a zinc hexacyanocobaltate-glyme complex, a THF solution of 22 g of polydimethylsiloxane terminated by alcoholic hydroxyl group at both end (FZ-3711; hydroxyl number: 50 mgKOH/g; available from Nippon Unicar Company Ltd.), and 4.6 g of propylene oxide were charged into an autoclave. The reaction mixture was then allowed to undergo reaction in a nitrogen atmosphere at a temperature of 76° C. Thereafter, to the reaction system was added 83 g of propylene oxide. Unreacted monomers and solvent were removed. The residue was purified to obtain 100 g of an oily matter. The oily matter thus obtained showed no macro phase separation even after a storage for 1 year at room temperature.

GPC analysis of the reaction product showed a single peak different from that of the alcohol-terminated polydimethylsiloxane as a starting material. The reaction product showed a hydroxyl number of 14.8 mgKOH/g.

To 70 g of the reaction product was then added dropwise 3.5 g of γ-isocyanatepropylmethyldimethoxysilane (KBM-9207, available from Shin-etsu Chemical Co.) in the presence of 0.01 g of tin octylate (U-28, available from Nitto Kasei Co., Ltd.) at a temperature of 75° C. The reaction continued until it was confirmed by IR that absorption by NCO had disappeared. Thus, an organopolysiloxane-polyoxyalkylene copolymer containing a reactive silicon group (polymer 2) was obtained.

SYNTHESIS EXAMPLE 3

0.08 g of a zinc hexacyanocobaltate-glyme complex, a THF solution of 94 g of a polydimethylsiloxane terminated by two hydroxyl groups at one end (X-22-176B; hydroxyl number: 45.2 mgKOH/g; available from Shin-etsu Chemical Co.) represented by the following general formula:

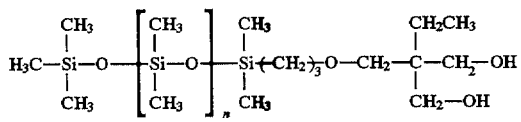

(in which n is about 30), and 4.3 g of propylene oxide were charged into an autoclave. The reaction mixture was then allowed to undergo reaction in a nitrogen atmosphere at a temperature of 86° C. Thereafter, to the reaction system was added 330 g of propylene oxide. Unreacted monomers and solvent were removed. The residue was then purified to obtain 410 g of an oily matter. The oily matter thus obtained showed no macro phase separation even after a storage for 1 year at room temperature.

GPC analysis of the reaction product showed a single peak different from that of the starting material. The reaction product showed a hydroxyl number of 13.1 mgKOH/g.

To 150 g of the reaction product was then added dropwise 6.6 g of γ-isocyanatepropylmethyldimethoxysilane (KBM-9207, available from Shin-etsu Chemical Co.) in the presence of 0.06 g of tin octylate (U-28, available from Nitto Kasei Co., Ltd.) at a temperature of 75° C. The reaction continued until it was confirmed by IR that absorption by NCO had disappeared. Thus, an organopolysiloxane-polyoxyalkylene copolymer containing a reactive silicon group (polymer 3) was obtained.

SYNTHESIS EXAMPLE 4

0.08 g of a zinc hexacyanocobaltate-glyme complex, a THF solution of 186 g of a polydimethylsiloxane terminated by two hydroxyl groups at one end (X-22-176D; hydroxyl number: 24.7 mgKOH/g; available from Shin-etsu Chemical Co.) represented by the following general formula:

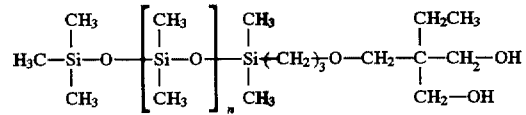

(in which n is about 60), and 4.1 g of propylene oxide were charged into an autoclave. The reaction mixture was then allowed to undergo reaction in a nitrogen atmosphere at a temperature of 86° C. Thereafter, to the reaction system was added 245 g of propylene oxide. Unreacted monomers and solvent were removed. The residue was then purified to obtain 420 g of an oily matter. The oily matter thus obtained showed no macro phase separation even after a storage for 1 year at room temperature.

GPC analysis of the reaction product showed a single peak different from that of the starting material. The reaction product showed a hydroxyl number of 11.4 mgKOH/g.

To 150 g of the reaction product was then added dropwise 5.8 g of γ-isocyanatepropylmethyldimethoxysilane (KBM-9207, available from Shin-etsu Chemical Co.) in the presence of 0.03 g of tin octylate (U-28, available from Nitto Kasei Co., Ltd.) at a temperature of 75° C. The reaction continued until it was confirmed by IR that absorption by NCO had disappeared. Thus, an organopolysiloxane-polyoxyalkylene copolymer containing a reactive silicon group (polymer 4) was obtained.

SYNTHESIS EXAMPLE 5

0.08 g of a zinc hexacyanocobaltate-glyme complex, a THF solution of 250 g of polydimethylsiloxane terminated by alcoholic hydroxyl group at both ends (F273-05; hydroxyl number: 15.3 mgKOH/g; available from Nippon Unicar Company Ltd.), and 4.1 g of propylene oxide were charged into an autoclave. The reaction mixture was then allowed to undergo reaction in a nitrogen atmosphere at a temperature of 86° C. Thereafter, to the reaction system was added 42 g of propylene oxide. Unreacted monomers and solvent were removed. The residue was then purified to obtain 290 g of an oily matter.

GPC analysis of the reaction product showed a single peak different from that of the starting material. The reaction product showed a hydroxyl number of 13.3 mgKOH/g. The oily matter showed no macro phase separation even after a storage for 1 year at room temperature.

To 170 g of the reaction product was then added dropwise 7.7 g of γ-isocyanatepropylmethyldimethoxysilane (KBM-9207, available from Shin-etsu Chemical Co.) in the presence of 0.03 g of tin octylate (U-28, available from Nitto Kasei Co., Ltd.) at a temperature of 75° C. The reaction continued until it was confirmed by IR that absorption by NCO had disappeared. Thus, an organopolysiloxane-polyoxyalkylene copolymer containing a reactive silicon group (polymer 5) was obtained.

SYNTHESIS EXAMPLE 6

104 g of an unsaturated group-terminated PPG having a molecular weight of about 3,000 (unsaturated group equivalent: 0.699 mmol/g), 26 g of an unsaturated group-terminated PPT having a molecular weight of about 3,000 (unsaturated group equivalent: 1.085 mmol/g), 400 g of toluene, and 36 μl of a chloroplatinic acid catalyst solution (solution of 25 g of $H_2PtCl_6 \cdot 6H_2O$ in 500 g of isopropanol) were charged into an autoclave where the mixture was then heated to a temperature of 90° C. To the reaction mixture was then added dropwise 72.5 g of polydimethylsiloxane terminated by Si—H group at both ends (XF40-A5019; polymerization degree: 40; effective hydrogen: 0.064 wt. %; available from Toshiba Silicone Co.) in 2.5 hours. Thereafter, to the mixture was then added dropwise 5.7 g (54 mmol) of methyldimethoxysilane. The reaction mixture was then allowed to undergo reaction for 2 hours. Volatile components were then removed under reduced pressure to obtain 200 g of a transparent light yellow viscous liquid (polymer 6).

EXAMPLES 3–7

To 100 parts by weight of each of the polymers 2 to 6 obtained in Synthesis Examples 2 to 6 were added 3 parts by weight of tin octylate and 0.5 parts by weight of laurylamine (guaranteed grade; available from Wako Pure Chemical Industries, Ltd.). The reaction mixture was stirred so that it was deformed, and then poured into a 2-mm thick mold. After 2 days of storage at a temperature of 23° C., the molded products showed no tack to a finger touch.

EXAMPLES 8–10

To 100 parts by weight of each of the polymers 2, 3 and 6 obtained in Synthesis Examples 2, 3 and 6 were added 120 parts by weight of calcium carbonate (Hakuenka CCR, available from Shiraishi Kogyo Kaisha, Ltd.), 30 parts by weight of titanium dioxide (Taipaque R820, Ishihara Sangyo Co.), 65 parts by weight of DOP (Kyowa Hakko Co.), 3 parts by weight of tin octylate, and 0.5 parts by weight of laurylamine (guaranteed grade, available from Wako Pure Chemical Industries, Ltd.). The mixture was deformed by stirring, and then molded into a 2-mm thick sheet. After storage for 2 days at a temperature of 23° C., the sheet was examined for residual tack by finger touch. For the evaluation of coat adhesivity, the sheet was allowed to stand at a temperature of 23° C. for 1 day. The sheet was then coated with a water-borne coating (Tilelac Suisei Top, available from Nippon Paint Co., Ltd.). The coated sheet was then cured at a temperature of 23° C. for one week. The coat film was then notched to make pieces of 5×5 squares. An adhesive cellophane tape was then attached on these squares. The tape was then forced to peel off the sheet at right angle. The coating adhesion was evaluated by the number (n) of squares left on the sheet (represented by n/25). The results are set forth in Table 2.

TABLE 2

|  | Example 8 | Example 9 | Example 10 |
| --- | --- | --- | --- |
| Polymer | Polymer 2 | Polymer 3 | Polymer 6 |
| Residual tack | No tack | No tack | No tack |
| Coating adhesion | 25/25 | 25/25 | 25/25 |

EXAMPLES 9–11

Comparative Example 3

To 100 parts by weight of each polymers 2 to 4 obtained in Synthesis Examples 2 to 4, respectively were added 120 parts by weight of calcium carbonate (Hakuenka CCR, available from Shiraishi Kogyo Kaisha, Ltd.), 30 parts by weight of titanium dioxide (Taipaque R820, Ishihara Sangyo Co.), 65 parts by weight of DOP (Kyowa Hakko Sangyo Co., Ltd.), 1 part by weight of an oxidation inhibitor (Nocrac NS-6, available from Ouchi Shinko kagaku K.K.), 1 part by weight of an ultraviolet absorbent (Tinuvin 327, available from Ciba Geigy), 1 part by weight of a light stabilizer (Sanol LS770, available from Ciba Geigy), 3 parts by weight of tin octylate, and 0.5 parts by weight of laurylamine (guaranteed grade, available from Wako Pure Chemical Industries, Ltd.). The mixture was deformed by stirring, and then molded into a 2-mm thick sheet. The sheets were each preserved at a temperature of 23° C. for 7 days and subsequently at a temperature of 50° C. for 7 days. The sheets were each subjected to examination by a sunshine weatherometer. After 1,000 hours, surface conditions of these sheets were observed. The polymer synthesized in Comparative Synthesis Example 1 was subjected to blending and curing in the same manner as above. The resulting sheet was subjected to the same test as above. After 1,000 hours, it was observed for surface conditions. The results are set forth in Table 3.

TABLE 3

|  | Example 9 | Example 10 | Example 11 | Comparative Example 3 |
| --- | --- | --- | --- | --- |
| Polymer | Polymer 2 | Polymer 3 | Polymer 4 | Comparative Polymer 1 |
| Surface conditions after 1,000 hours | No change | No change | No change | Cracked |

EXAMPLE 12

Comparative Example 4

To 100 parts by weight of the polymer 5 obtained in Synthesis Example 5 were added 100 parts by weight of calcium carbonate (Hakuenka CCR, available from Shiraishi Kogyo Kaisha, Ltd.), 40 parts by weight of ground calcium carbonate (Whiton SB, available from Shiraishi Kogyo Kaisha, Ltd.), 10 parts by weight of titanium dioxide (Taipaque R820, Ishihara Sangyo Co.), 1 part by weight of an oxidation inhibitor (Nocrac NS-6, available from Ouchi Shinko kagaku K.K.), 1 part by weight of an ultraviolet absorbent (Tinuvin 327, available from Ciba Geigy), 3 parts by weight of tin octylate, and 0.5 parts by weight of laurylamine (guaranteed grade, available from Wako Pure Chemical Industries, Ltd.). The mixture was stirred so that it was deformed, and then molded into a 2-mm thick sheet. The sheets were each cured at a temperature of 23° C. for 7 days and then at a temperature of 50° C. for 7 days. The sheets were each subjected to examination by a sunshine weatherometer. After 1,500 hours, surface conditions of these sheets were observed. The polymer synthesized in Comparative Synthesis Example 1 was subjected to blending and curing in the same manner as above. The resulting sheet was subjected to the same test as above. After 1,500 hours, surface conditions were observed. The results are set forth in Table 4.

TABLE 4

|  | Example 12 | Comparative Example 4 |
| --- | --- | --- |
| Polymer | Polymer | Comparative Polymer 1 |
| Surface conditions after 1,500 hours | No change | Totally cracked |

EXAMPLE 13

The joint of two sheets of granite whose adherent surface had been coated with a primer (No. 40, The Yokohama Rubber Co., Ltd.) was filled with a composition having the same formulations as used in Example 12. The material was then cured.

After outdoors exposure for four months, no contamination was observed in the vicinity of the joint of the pieces of granite.

While the invention has been described in detail and with reference to specific embodiments thereof, it will be apparent to one skilled in the art that various changes and modifications can be made therein without departing from the spirit and scope thereof.

What is claimed is:

1. A curable polymer composition comprising:
   (A) a reactive silicon group-containing polymer, containing at least one reactive silicon group per molecule, a main chain of which is essentially a copolymer of organopolysiloxane and polyoxyalkylene, said organopolysiloxane moiety in the copolymer is 11.4 wt % or more per copolymer, said at least one reactive silicon group being bonded to the polyoxyalkylene chain and represented by the formula:

wherein $R^{12}$ represents a $C_{1-20}$ alkyl group, a $C_{6-20}$ aryl group, or $C_{7-20}$ aralkyl group, with the proviso that when there are a plurality of $R^{12}$, $R^{12}$ may be the same or different; X' represents a hydrolyzable group selected from the group consisting of a halogen atom, an alkoxy group, an acyloxy group, a ketoximate group, an amino group, an amide group, an acid amide group, an aminoxy group, a mercapto group, and an alkenyloxy group, with the proviso that when there are two or more X', X' may be the same or different; and g represents an integer 1 to 3; and (B) a silanol condensation catalyst.

2. The curable polymer composition according to claim 1, wherein the organopolysiloxane and polyoxyalkylene in said polymer are bonded to each other via silicon-carbon bond.

* * * * *